United States Patent [19]
Eckert et al.

[11] Patent Number: 5,980,715
[45] Date of Patent: Nov. 9, 1999

[54] ELECTRODEPOSITION COATING MATERIALS AND A PROCESS FOR COATING ELECTRONICALLY CONDUCTIVE SUBSTRATES

[75] Inventors: Karin Eckert, Steinfurt; Uwe Buder, deceased, late of Nottuln, by Gudrun Buder, legal representative; Susanne Piontek, Münster; Margret Stockbrink, Münster; Ulrich Heimann, Münster, all of Germany

[73] Assignee: BASF Lacke + Farben AG, Muenster-Hiltrup, Germany

[21] Appl. No.: 08/815,624

[22] Filed: Mar. 13, 1997

Related U.S. Application Data

[63] Continuation of application No. 08/464,783, filed as application No. PCT/EP93/03500, Dec. 10, 1993, abandoned.

[30] Foreign Application Priority Data

Dec. 24, 1992 [DE] Germany ............................ 42 44 209

[51] Int. Cl.⁶ .................................................. C25D 13/04
[52] U.S. Cl. ......................... 204/501; 204/505; 523/415; 524/901
[58] Field of Search ..................................... 204/501, 505; 523/415; 524/901

[56] References Cited

U.S. PATENT DOCUMENTS

| | | | |
|---|---|---|---|
| 3,476,668 | 11/1969 | Scheiber et al. | 204/181 |
| 3,869,366 | 3/1975 | Suzuki et al. | 204/181 |
| 4,482,446 | 11/1984 | Streitberger et al. | 204/181 C |
| 4,948,678 | 8/1990 | Shindou et al. | 428/623 |
| 5,166,255 | 11/1992 | Anderson, Jr. et al. | 524/441 |

FOREIGN PATENT DOCUMENTS

| | | |
|---|---|---|
| 22 48 836 | 10/1972 | Germany . |
| 29 23 589 | 6/1980 | Germany . |
| 1-298198 | 12/1989 | Japan . |

*Primary Examiner*—Kathryn L. Gorgos
*Assistant Examiner*—Kishor Mayekar

[57] ABSTRACT

The invention relates to cathodically depositable, aqueous electrodeposition coating materials which are characterized in that they contain particles of wax having a diameter of from 1 to 20 μm.

25 Claims, 1 Drawing Sheet

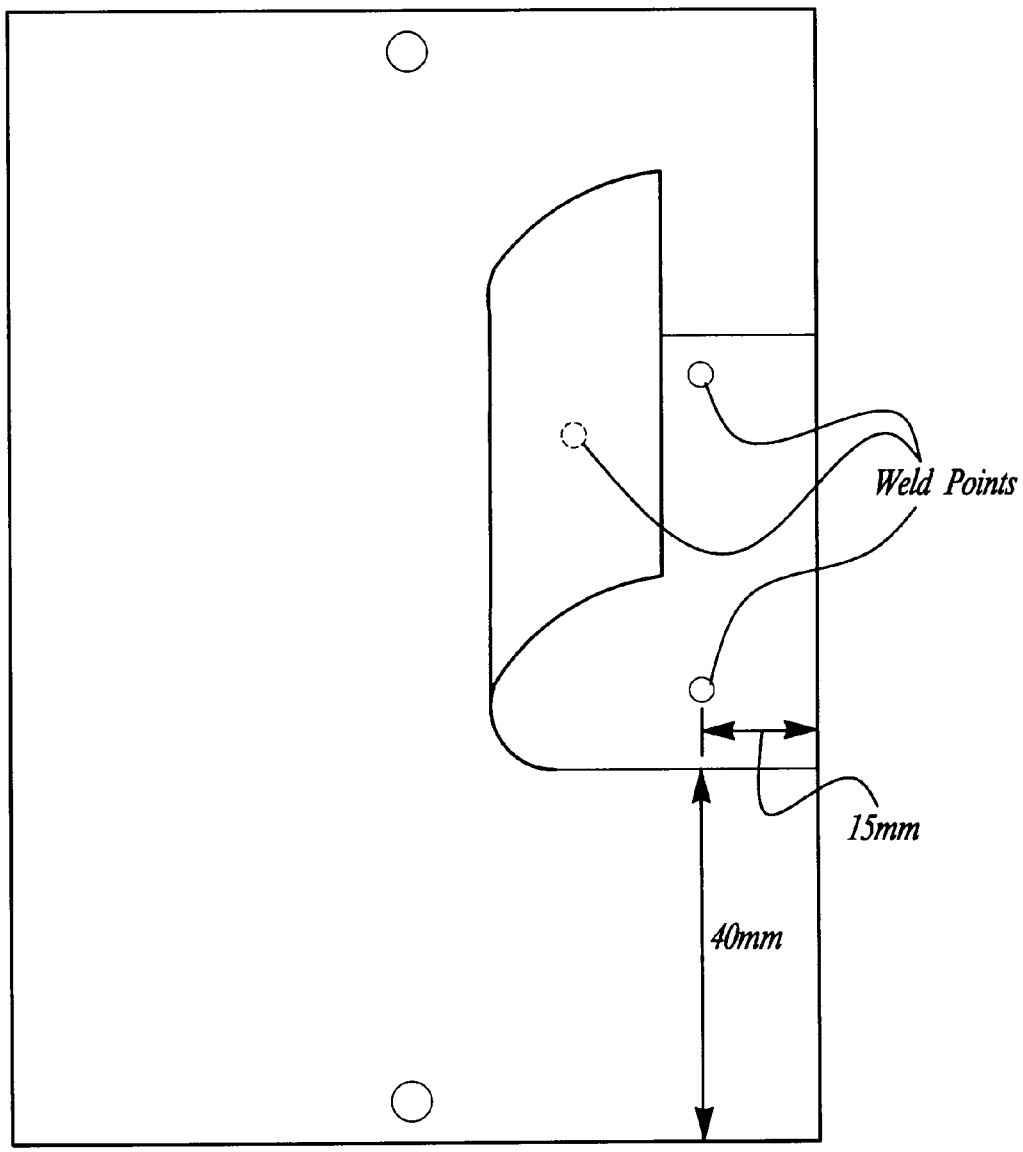

ELECTRODEPOSITION COATING MATERIALS AND A PROCESS FOR COATING ELECTRONICALLY CONDUCTIVE SUBSTRATES

This is a continuation of U.S. patent application Ser. No. 08/464,783, filed Aug. 21, 1995, now abandoned which is a 35 USC 371 National Stage filing of PCT/EP93/03500, filed on Dec. 10, 1993.

BACKGROUND AND SUMMARY OF THE INVENTION

The invention relates to cathodically depositable aqueous electrodeposition coating materials and to a process for coating electrically conductive substrates, in which
(1) the substrate is immersed in a cathodically depositable aqueous electrodeposition coating material,
(2) the substrate is connected as cathode,
(3) using direct current, a film is deposited on the substrate,
(4) the coated substrate is removed from the electrodeposition coating material, and
(5) the deposited coating film is baked.

Cathodically depositable, aqueous electrodeposition coating materials and the above-described process for coating electrically conductive substrates are known (cf. e.g. EP-B-301 293, DE-A-35 18 732, DE-A-35 18 770, EP-A-4090, EP-A-12 463, EP-A-262 069, U.S. Pat. No. 3,799,854, U.S. Pat. No. 4,031,050, U.S. Pat. No. 4,252,703, U.S. Pat. No. 4,332,711, DE-A-31 08 073, DE-A-27 01 002, EP-A-59 895, DE-A-31 03 642 and DE-A-32 15 891). Cathodic electrodeposition coating using cathodically depositable, aqueous electrodeposition coating materials has become established as a process for the automatic coating of bulky products, in particular vehicle bodies. Advantages of electrodeposition coating using cathodically depositable, aqueous electrodeposition coating materials are, for example, its environmental friendliness (water as solvent), very good material yield and high reliability with extensive automation of plants.

The present invention is based on the object of providing new cathodically depositable, aqueous electrodeposition coating materials which give coats having improved properties, in particular with regard to the formation of runs (runouts, boilouts), sensitivity to drops of water, and bridging.

Interfering runs can be formed if, during the baking process, electrodeposition coating material emerges from, for example, seams and runs down the coated surface. When the substrates present are of complex shape (e.g. V-shaped metal sheets) the emerging electrodeposition coating material may solidify in the form of bridges. In this case, bridging defects are the result. If—prior to the baking process—water or diluted electrodeposition coating material drips onto the electrodeposition coating film which, although not yet baked, has dried superficially, then, in the case of electrodeposition coating films with a high sensitivity to water drops, water-spotting defects can be seen after baking.

It is often attempted to eliminate the defects described above by adding surfactants. However, in many cases the addition of surfactants results in new interfering side-effects, for example the formation of foam and/or delamination of coatungs applied subsequently.

The present invention is based in particular on the object of eliminating as far as possible the defects described above without producing new interfering side-effects, for example the formation of foam and/or delamination of coatings applied subsequently.

This object is surprisingly achieved by adding, to cathodically depositable, aqueous electrodeposition coating materials known per se, particles of wax having a diameter of from 1 to 20 μm. When incorporating the particles of wax into the electrodeposition coating material, those skilled in the art can employ all methods known to them for incorporating particulate additives into electrodeposition coating materials. It is preferred to incorporate the particles of wax in powder form or in the form of a dispersion in water, in a water-miscible organic solvent or in a mixture of water-miscible organic solvents into the pigment paste.

BRIEF DESCRIPTION OF THE DRAWING

The drawing illustrates the configuration of the test specimens used in the examples to demonstrate the advantages provided by the coatings of the invention.

DETAILED DESCRIPTION

In the context of the present invention, the term "wax" is understood to refer to all naturally occurring and synthetic substances having the following properties:
1. Plastic at 20° C., firm to hard and brittle.
2. Coarsely to finely crystalline, translucent to opaque, but not vitreous.
3. Melting at above 40° C. without decomposition.
4. Of relatively low viscosity even only just above the melting point.
5. Heavily temperature-dependent in consistency and solubility.
6. Polishable under gentle pressure.

If a substance fails to conform to more than one of these properties, it is no longer a "wax" in the sense of this invention (cf. Ullmanns Enzyklopädie der technischen Chemie [Ullmann's Encyclopedia of Industrial Chemistry]; 4th revised and extended edition; Verlag Chemie; Weinheim; Deerfield Beach, Fla.; Basel, 1983, page 3).

According to the present invention, modified or unmodified polyolefin waxes are preferably modified or unmodified polyethylene or polypropylene waxes having a melting point which is preferably less than 150° C., particularly preferably less than 140° C. and very particularly preferably less than 115° C. It is very particularly preferred to employ modified or unmodified polyethylene waxes having a melting point of less than 150° C., particularly preferably less than 140° C. and very particularly preferably less than 115° C. in the form of particles having a diameter of from 1 to 20 μm.

The above-described particles of wax are commercially available (Hoechst polyethylene and polypropylene waxes, Hoechst AG; Vestowax, Chemische Werke Huls; Polywax, Petrolite Corporation, USA; Hi-Wax, Mitsui Petrochemical Industries, Japan; LANCO-WAX, Langer+Co., BRD; FORBEST, Lucas Meyer GmbH & Co. KG, BRD; DEUTERON, W. O. C. Schöner GmbH, BRD, etc.).

The addition in accordance with the invention of particles of wax to cathodically depositable, aqueous electrodeposition coating materials has a particularly advantageous effect when the electrodeposition coating material contains from 0.01 to 5.00% by weight, preferably from 0.05 to 1.00% by weight and particularly preferably from 0.05 to 0.50% by weight of wax, based on the overall solids content of the electrodeposition coating material.

The above-described particles of wax are preferably employed in cathodically depositable, aqueous electrodeposition coating materials which contain either a cationic, amine-modified epoxy resin or a mixture of cationic, amine-modified epoxy resins as binder and a blocked polyisocyanate or a mixture of blocked polyisocyanates as crosslinking agent and/or a cationic, amine-modified epoxy resin which has been made autocrosslinkable by reaction with a partially blocked polyisocyanate, or a mixture of such autocrosslinkable cationic, amine-modified epoxy resins. The above-described particles of wax are particularly preferably employed in cathodically depositable, aqueous electrodeposition coating materials which contain a cationic, amine-modified epoxy resin or a mixture of cationic, amine-modified epoxy resins as binder and a blocked polyisocyanate or a mixture of blocked polyisocyanates as crosslinking agent.

Cationic, amine-modified epoxy resins are extensively employed as binders in cathodically depositable, aqueous electrodeposition coating materials (cf. for example DE-A-35 18 732, DE-A-35 18 770, EP-A-40 990 and EP-A-12 463). Cationic, amine-modified epoxy resins can be prepared by reacting modified or unmodified polyepoxides with amines and subsequently neutralizing—at least partially—the resulting reaction products with acids, and dispersing them in water. The polyepoxides which are preferably employed are polyglycidyl ethers of polyphenols, which are preferably prepared from polyphenols, in particular bisphenol A and epihalohydrins, especially epichlorohydrins. These polyepoxides can be modified, before or after the reaction, with one or more amines, by reacting some of the reactive groups with a modifying compound. Examples of modifying compounds which may be mentioned are:

a) compounds containing carboxyl groups, such as saturated or unsaturated monocarboxylic acids (e.g. benzoic acid, linseed oil fatty acid, 2-ethylhexanoic acid, Versatic acid), aliphatic, cycloaliphatic and/or aromatic dicarboxylic acids of various chain length (e.g. adipic acid, sebacic acid, isophthalic acid or dimeric fatty acids), hydroxyalkylcarboxylic acids (e.g. lactic acid, dimethylolpropionic acid) and polyesters containing carboxyl groups, or b) compounds containing amino groups, such as diethylamine or ethylhexylamine or diamines containing secondary amino groups, e.g. N,N'-dialkylalkylenediamines such as dimethylethylenediamine, N,N'-dialkyl-polyoxyalkyleneamines such as N,N'-dimethylpolyoxypropylenediamine, cyanoalkylated alkylenediamines such as bis-N,N'-cyanoethyl-ethylenediamine, cyanoalkylated polyoxyalkyleneamines such as bis-N,N'-cyanoethylpolyoxypropylenediamine, polyaminoamides, for example Versamides, in particular the products, containing terminal amino groups, of the reaction of diamines (e.g. hexamethylenediamine), polycarboxylic acids, in particular dimeric fatty acids and monocarboxylic acids, in particular fatty acids, or the reaction product of one mole of diaminohexane with two moles of monoglycidyl ether or monoglycidyl ester, specifically glycidyl esters of α-branched fatty acids such as those of Versatic acid, or c) compounds containing hydroxyl groups, such as neopentylglycol, bis-ethoxylated neopentylglycol, neopentylglycol hydroxypivalate, dimethylhydantoin-N-N'-diethanol, hexane-1,6-diol, hexane-2,5-diol, 1,4-bis(hydroxymethyl)cyclohexane, 1,1-isopropylidene-bis(p-phenoxy)-2-propanol, trimethylolpropane, pentaerythritol or amino alcohols such as triethanolamine, methylketimines such as aminomethylpropane-1,3-diol methyl isobutyl ketimine or tris(hydroxymethyl)aminomethane cyclohexanone ketimine, and also polyglycol ethers, polyesterpolyols, polyetherpolyols, polycaprolactonepolyols and polycaprolactampolyols of various functionality and molecular weights, or d) saturated or unsaturated fatty acid methyl esters which are transesterified in the presence of sodium methylate with hydroxyl groups of the epoxy resins.

The modified or unmodified polyepoxide is, as already stated, reacted—before or after an optional reaction with modifying compounds—with one or more amines. The amine or amines should be water-soluble compounds. Examples of amines which can be employed are mono- and dialkylamines such as, for example, methylamine, ethylamine, propylamine, butylamine, dimethylamine, diethylamine, dipropylamine, methylbutylamine etc., alkanolamines, for example methylethanolamine, diethanolamine etc. and dialkylaminoalkylamines, for example dimethylaminoethylamine, diethylaminopropylamine, dimethylaminopropylamine etc. The polyepoxides are preferably reacted with secondary amines or with a mixture of secondary amines.

The polyepoxides which have been reacted with the amines are at least partially protonated with an acid, for example boric acid, formic acid, lactic acid, acetic acid etc. and dispersed in water. The resulting binder dispersion can then be used for producing electrodeposition coating materials.

Autocrosslinkable amine-modified epoxy resins can be prepared by further reacting the above-described reaction products of polyepoxides, modifying or non-modifying compounds and amines with at least one partially blocked polyisocyanate, preferably with at least one semi-blocked diisocyanate. Such binders are well known to those skilled in the art and therefore require no further description here.

The cationic, amine-modified epoxy resins which are preferably employed can be prepared by subjecting epoxide compounds which can be prepared by reacting (a) a diepoxide compound or a mixture of diepoxide compounds having an epoxide equivalent weight of less than 2000 with (b) a compound which contains a phenol or thiol group and which reacts monofunctionally with epoxide groups under the given reaction conditions, or a mixture of such compounds, components (a) and (b) being employed in a molar ratio of from 10:1 to 1:1, preferably from 4:1 to 1.5:1, and the reaction of component (a) with component (b) being carried out at from 100 to 190° C., optionally in the presence of a catalyst (cf. DE-A-35 18 770), as described above to reaction with amines, and dispersing the products in water.

Cationic, amine-modified epoxy resins which are likewise preferably employed can be prepared by subjecting epoxide compounds which can be prepared by polyaddition, which is carried at from 100 to 195° C. in the presence or absence of a catalyst and is initiated by a monofunctionally reacting initiator which carries either an alcoholic OH group, a phenolic OH group or an SH group, of a diepoxide compound and/or a mixture of diepoxide compounds, together if desired with at least one monoepoxide compound, to give an epoxy resin in which diepoxide compound and initiator are incorporated in a molar ratio of greater than from 2:1 to 10:1 (cf. DE-A-35 18 732), as described above to reaction with amines, and dispersing the products in water.

The use of blocked polyisocyanates as crosslinking agents in cathodically depositable, aqueous electrodeposition coating materials has also already been known for a long time and is conventional (cf. the above-cited patent documents). Blocked polyisocyanates are polyisocyanates in which the isocyanate groups have been reacted with a blocking agent (e.g. alcohol, phenol, amine, oxime etc.), the blocking agent having been selected such that the blocked polyisocyanate groups react with the hydroxyl and amino groups contained in the cationic, amine-modified epoxy resin only at relatively high temperatures, generally not until above 90° C. The polyisocyanates which can be employed are all polyisocyanates suitable for coating materials. Examples of polyisocyanates which can be employed are diisocyanates such as hexamethylene diisocyanate, 2,4-tolylene diisocyanate, 2,6-tolylene diisocyanate, isophorone diisocyanate etc. and triisocyanates, for example trimerized hexamethylene diisocyanate and trimerized isophorone diisocyanate. It is also possible to employ mixtures of polyisocyanates and prepolymers, in particular prepolymers of polyols and polyisocyanates, as polyisocyanates. Examples of blocking agents which can be employed are: aliphatic, cycloaliphatic and aromatic alkylmonoalcohols, for example methyl, ethyl, propyl, butyl, amyl, hexyl, heptyl, octyl, nonyl, 3,3,5-trimethylhexyl, decyl and laurylalcohol and cyclopentanol, cyclohexanol, phenylcarbinol and methylphenylcarbinol. Further blocking agents which can be employed are hydroxylamines, for example ethanolamine, oximes, for example methyl ethyl ketone oxime, acetone oxime and cyclohexanone oxime and amines, for example dibutylamine and diisopropylamine. The abovementioned polyisocyanates can also be employed for preparing the autocrosslinking, cationic, amine-modified epoxy resins. For this purpose it is merely necessary to block the polyisocyanates such that, on arithmetic average, one isocyanate group per molecule remains unblocked, and then to react these partially blocked polyisocyanates with the amine-modified epoxy resin.

In addition to the components described above, the electrodeposition coating materials can also contain pigments, fillers, organic solvents, antioxidants, surfactants etc. The incorporation of pigments, fillers and further additives, for example the particles of wax employed in accordance with the invention, is carried out with the aid of pigment pastes. This procedure and the preparation of pigment pastes are well known in the art (cf. e.g. the above-cited patent documents and D. H. Parker, Principles of Surface Technology, Intersience [sic] Publishers, New York (1965); R. L. Yates, Electropainting, Robert Draper Ltd., Teddington/England (1966) and H. F. Payne, Organic Coating Technology, volume 2, Wiley and Sons, New York (1961).

The solids content of the electrodeposition coating materials is preferably from 7 to 35% by weight, particularly preferably from 12 to 25% by weight. The weight ratio of the cationic, amine-modified epoxy resin to the blocked polyisocyanate is generally between 20 and 1.5, preferably between 5 and 2.5.

Using the electrodeposition coating materials according to the invention, it is in principle possible to coat all electrically conducting substrates. The electrodeposition coating materials according to the invention are employed in particular for coating vehicle bodies. The electrodeposition coating materials according to the invention can also be applied by spraying, brushing, knife-coating etc. to electrically conducting and to electrically nonconducting substrates, and baked.

The invention is illustrated in more detail in the following examples. All parts and percentages are by weight, unless expressly stated otherwise.

1. Preparation of Crosslinking Agents 1.1 Crosslinking agent 1

1133 g of tolylene diisocyanate (mixture of approximately 80% 2,4 and 20% 2,6 isomer) and 356 g of methyl isobutyl ketone are initially introduced under a nitrogen atmosphere to a reactor fitted with a stirrer, reflux condenser, internal thermometer and inert gas inlet. 0.7 g of dibutyltin dilaurate is added, and 290 g of trimethylolpropane are added in the form of small portions over a period of 4 hours at equal time intervals. Cooling is regulated such that the temperature of the reaction mixture does not exceed 45° C.

30 minutes after adding the final portion of trimethylolpropane, an NCO equivalent weight of 217 (based on solids) is measured. Then 722 g of n-propylglycol are added dropwise over the course of one hour with further cooling. When the addition is complete, the temperature is raised to 86° C. The mixture is then heated to 100° C. and allowed to react for a further hour. No further NCO groups can be detected during further checking. The mixture is then cooled and diluted with 500 g of methyl isobutyl ketone. The solution of this polyurethane crosslinking agent has a solids content of 69.8% (measured for 1 hour at 130° C.).

1.2 Crosslinking agent 2

1146 g of trimerized hexamethylene diisocyanate having an NCO equivalent weight of 191 ("Basonat PLR 8638", BASF) and 339 g of methyl isobutyl ketone are heated with stirring to 50° C. under a nitrogen atmosphere in a reactor as described in the preceding example. 774 g of di-n-butylamine are then added dropwise over 4 hours. During this addition the temperature is held at below 55° C. by cooling. The solution of crosslinking agent is then cooled and diluted with a further 141 g of methyl isobutyl ketone. The solids content is 79.5% (measured for 1 hour at 130° C.).

2. Preparation of a Binder Dispersion 1698 parts of an epoxy resin based on bisphenol A having an EEW (epoxide equivalent weight) of 490 are heated to 105° C. together with 227 parts of dodecylphenol and 101 parts of xylene under a nitrogen atmosphere in a reactor. As soon as the melt is clear, residual traces of water are removed over the course of 20 min by azeotropic reflux distillation in vacuo using a water separator. The melt is then heated to 130° C. and 3 parts of N,N-dimethylbenzylamine are added. The mixture is maintained at this temperature until the EEW has readhed a value of 1100. 126 parts of butylglycol, 127 parts of diethanolamine and 223 parts of xylene are then added and the mixture is cooled to 90° C. One hour later the mixture is diluted with 125 parts of propylene glycol phenyl ether and 317 parts of isobutanol and cooled to 60° C. 40 parts of N,N-dimethylaminopropylamine are then added, and the mixture is heated to 90° C. and held for 2 hours at this temperature. It is then cooled to 70° C. and 280 parts of Plastilit 3060 (polypropylene glycol compound, BASF), 805 parts of crosslinking agent 1 (section 1.1) and 704 parts of crosslinking agent 2 (cf. section 1.2) are added, and the resin mixture is homogenized for 20 min and transferred to a dispersion vessel, where 91.7 parts of lactic acid (88% strength) are added and the mixture is diluted, while stirring, with 2112 parts of deionized water in portions. It is then homogenized for 20 min before further dilution with a further 3000 parts of deionized water in small portions.

The volatile solvents are removed by distillation in vacuo, and then replaced by an equal quantity of deionized water. The dispersion has the following characteristics:
Solids content: 35% (1 hour at 130° C.)
Base content: 0.570 milliequivalents/g of solids
Acid content: 0.226"
pH: 6.2

3. Production of a Grinding Resin 30.29 parts of an epoxy resin based on bisphenol A and having an epoxide equivalent weight (EEW) of 188, 9.18 parts of bisphenol A, 7.04 parts of dodecylphenol and 2.37 parts of butylglycol are initially introduced into a reactor fitted with stirrer, internal thermometer, nitrogen inlet and water separator with reflux condenser. The mixture is heated to 110° C., 50 g of xylene are added, and the latter is distilled off again under a slight vacuum together with any possible traces of water. 0.07 part of triphenylphoshine is then added and the mixture is heated to 130° C. After an exothermic increase in temperature to 150° C., the mixture is subsequently allowed to react at 130° C. for a further 1 h.

The EEW of the reaction mixture at this point is 860. While cooling the mixture, 9.91 parts of butylglycol and 17.88 parts of a polypropylene glycol diglycidyl ether having an EEW of 333 (DER 732, Dow Chemical) are added. At 90° C., 4.23 parts of 2,2'-aminoethoxyethanol and, 10 min later, 1.37 parts of N,N-dimethylaminopropylamine are added. After a short period of exothermic reaction, the mixture is maintained at 90° C. for a further 2 h, until the viscosity remains constant, and is then diluted with 17.66 parts of butylglycol. The resin has a solids content of 69.8% (measured for 1 h at 130° C.).

4. Production of Pigment Pastes 4.1 Production of a pigment paste without particles of wax 60 parts by weight of deionized water, 1.2 parts by weight of acetic acid (90% strength) and 50 parts by weight of the grinding resin prepared as in section 3. are premixed. Then 1 part by weight of carbon black, 4 parts by weight of basic lead silicate, 15 parts by weight of aluminum silicate, e.g. ASP 200, Langer+Co., 66 parts by weight of titanium dioxide and 4 parts by weight of dibutyltin oxide are added and mixed for 30 minutes in a dissolver-stirrer running at high speed. The mixture is then dispersed in a small laboratory mill for 1 to 1.5 h to a Hegmann fineness of less than 12 $\mu$m, and adjusted with further water if appropriate to the desired processing viscosity.

4.2 Production of a pigment paste with particles of wax

The procedure as described in section 4.1 is followed with the sole exception that, in addition, 0.5 part by weight of pulverulent paraffin wax (Forbest MF II, Lucas Meyer GmbH & Co. KG, Hamburg) is weighed out and added.

5. Formulation of Electrodeposition Coating Baths 5.1 Formulation of an electrodeposition coating bath without particles of wax 397 parts by weight of the binder dispersion prepared as in section 2. are diluted with 460 parts by weight of deionized water and with 3 parts by weight of 10% strength acetic acid. 140 parts by weight of the pigment paste produced as in section 4.1 are added with stirring to the binder dispersion thus diluted. The electrodeposition coating bath is left to age at room temperature for 5 days.

5.2 Formulation of an electrodeposition coating bath with particles of wax

The procedure as described in section 5.1 is followed, with the sole exception that, instead of 140 parts by weight of the pigment paste produced as in section 4.1, 140 parts by weight of the pigment paste produced as in section 4.2 are added to the diluted binder dispersion.

6. Production of Test Specimens to be Coated

A phosphated standard metal test panel is cut in half with plate shears to 10.5×9.5 cm. One of the panel halves is clamped, with the 10.5 cm long side downward, into a conical mandrel bending apparatus such that the end of the panel is located at the smallest diameter. The panel is then bent around the conical mandrel by 90°. The bent panel is fastened to a second phosphated standard panel (10.5×19.5 cm) in accordance with the drawing 1/1 at 3 weld points, such that the test faces lie against one another.

7. Deposition of Coating Films on the Test Specimens Produced as in Section 6

In each case one test specimen produced as in section 6 is immersed in the vertical position into the electrodeposition coating bath prepared as in section 5.1 or, respectively, in section 5.2 and connected as cathode. The deposition of the coating films is carried out for 2 minutes at approximately 350 volts. The bath temperature is maintained at 29° C. The deposited wet films are rinsed with deionized water. The coating films are then baked for 20 minutes at 165° C. In comparison to the test specimen coated using the electrodeposition coating bath prepared as in section 5.1, the test specimen coated using the electrodeposition coating bath prepared as in section 5.2 exhibits markedly fewer interfering runs and greatly reduced bridging.

To test for sensitivity to water drops, in each case one phosphated standard metal test panel is immersed in the electrodeposition coating bath prepared as in section 5.1 or, respectively, as in section 5.2 and connected as cathode. The deposition of the coating films is carried out for 2 minutes at approximately 350 volts. The bath temperature is maintained at 29° C. The deposited wet films are rinsed with deionized water, dried at room temperature for 5 minutes and provided with drops of deionized water. After having allowed the water to act for 5 minutes, the coating films are baked in the horizontal position at 165° C. for 20 minutes. In comparison to the test panel coated using the electrodeposition coating bath prepared as in section 5.1, the test panel coated using the electrodeposition coating bath prepared as in section 5.2 exhibits markedly less interfering water-spotting.

We claim:

1. An aqueous coating composition, comprising:
   (a) a cationic, amine-modified epoxy resin and
   (b) from about 0.05 up to about 0.50 percent by weight, based upon the total weight of nonvolatile materials of the coating composition, of a wax, said wax being in the form of particles having a diameter of from 1 to 20 microns.

2. An aqueous coating composition according to claim 1, further including a blocked isocyanate or a mixture of blocked isocyanates.

3. An aqueous coating composition according to claim 1, wherein the epoxy resin is self-crosslinkable.

4. An aqueous coating composition according to claim 1, wherein the epoxy resin is the reaction product of an amine with a polyglycidyl ether of a polyphenol.

5. An aqueous coating composition according to claim 1, wherein the amine-modified epoxy resin is made cationic by at least partially protonating with an acid selected from the group consisting of formic acid, lactic acid, acetic acid, and mixtures thereof.

6. An aqueous coating composition according to claim 1, wherein the wax is a polyolefin wax.

7. An aqueous coating composition according to claim 1, wherein the wax is selected from the group consisting of polyethylene waxes, polypropylene waxes, and mixtures thereof.

8. An aqueous coating composition according to claim 7, wherein the wax has a melting point between about 40° C. and about 150° C.

9. An aqueous coating composition according to claim 7, wherein the wax has a melting point between about 40° C. and about 140° C.

10. An aqueous coating composition according to claim 1, wherein the wax has a melting point between about 40° C. and about 115° C.

11. A method of preparing an aqueous coating composition, comprising the steps of:

(a) preparing an amine-modified epoxy resin;

(b) at least partially protonating the amine-modified epoxy resin with an acid selected from the group consisting of formic acid, lactic acid, acetic acid, and mixtures thereof;

(c) dispersing the protonated epoxy resin in water;

(d) adding to the dispersed resin a pigment paste, said pigment paste comprising at least one pigment and at least one wax, said wax being in the form of particles having a diameter of from 1 to 20 microns;

wherein said wax is present at from about 0.05 up to about 0.50 percent by weight, based upon the total weight of nonvolatile materials of the coating composition.

12. A method according to claim 11, further including a step of blending the amine-modified epoxy resin with a blocked isocyanate or a mixture of blocked isocyanates.

13. A method according to claim 11, wherein the epoxy resin prepared is self-crosslinkable.

14. A method according to claim 11, wherein the epoxy resin is prepared by reacting an amine with a polyglycidyl ether of a polyphenol.

15. A method according to claim 11, wherein the wax is a polyolefin wax.

16. A method according to claim 11, wherein the wax is selected from the group consisting of polyethylene waxes, polypropylene waxes, and mixtures thereof.

17. A method according to claim 16, wherein the wax has a melting point between about 40° C. and about 150° C.

18. A method according to claim 16, wherein the wax has a melting point between about 40° C. and about 140° C.

19. A method according to claim 16, wherein the wax has a melting point between about 40° C. and about 115° C.

20. A method of decreasing surface defects of an electrodeposited coating on a substrate, comprising the steps of:

(a) preparing an aqueous coating composition comprising a cationic, amine-modified epoxy resin and from about 0.05 to about 0.5 percent by weight, based upon the total weight of nonvolatile materials of the coating composition, of a wax, said wax being in the form of particles having a diameter of from 1 to 20 microns;

(b) immersing the substrate in the aqueous coating composition;

(c) with the substrate connected as cathode, depositing a coating on the substrate with direct current; and (d) curing the deposited coating to form a cured coating on the substrate, wherein the wax is present in an amount sufficient to decrease at least one surface defect selected from the group consisting of water spotting, bridging, and runs.

21. A method according to claim 20, wherein the wax is a polyolefin wax.

22. A method according to claim 20, wherein the wax is selected from the group consisting of polyethylene waxes, polypropylene waxes, and mixtures thereof.

23. A method according to claim 22, wherein the wax has a melting point between about 40° C. and about 150° C.

24. A method according to claim 22, wherein the wax has a melting point between about 40° C. and about 140° C.

25. A method according to claim 22, wherein the wax has a melting point between about 40° C. and about 115° C.

* * * * *